INVENTORS
James H. DeClaire, &
BY Akira Tanaka
Herbert Furman
ATTORNEY

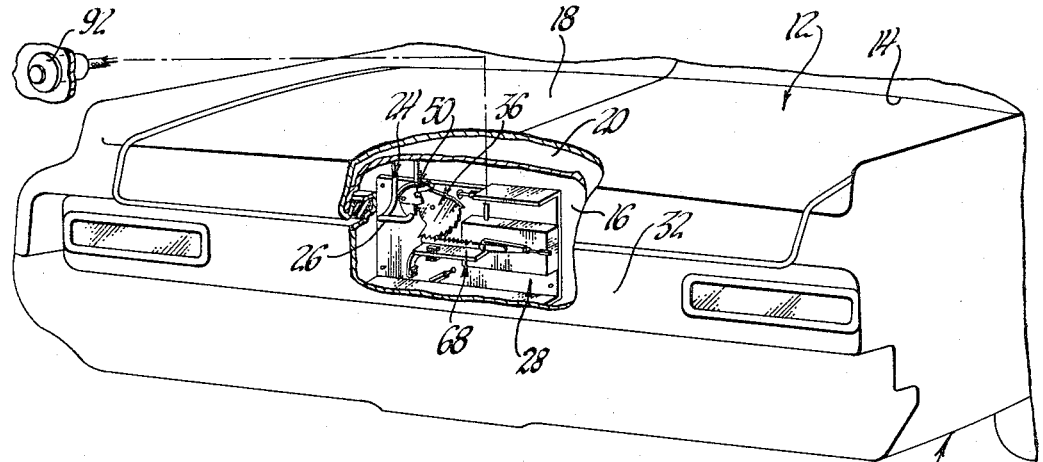
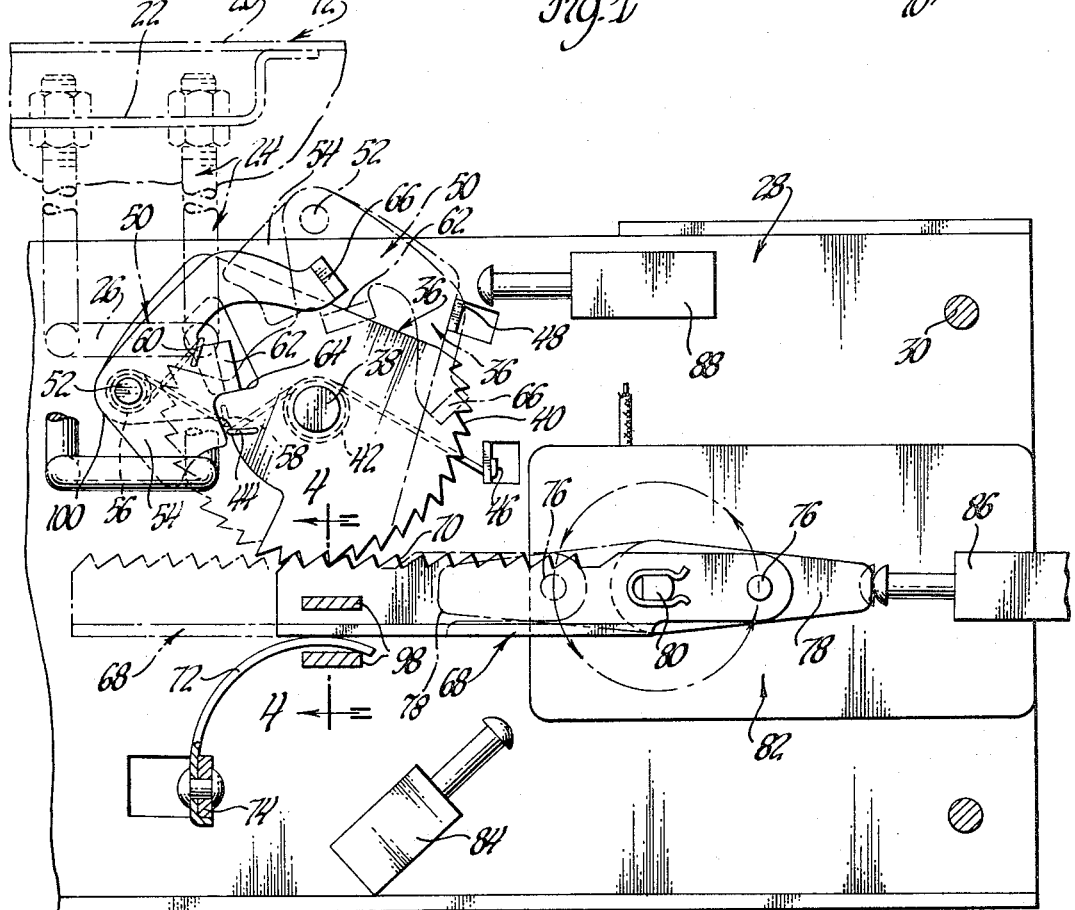

United States Patent Office 3,332,713
Patented July 25, 1967

3,332,713
CLOSURE LATCH
James H. De Claire, East Detroit, and Akira Tanaka, Southfield, Mich., assignors to General Motors Corporation, Detroit, Mich., a corporation of Delaware
Filed May 5, 1965, Ser. No. 453,390
8 Claims. (Cl. 292—201)

This invention relates to closure latches and more particularly to power operated vehicle body closure latches.

One feature of this invention is that it provides an improved vehicle body closure latch. Another feature of this invention is that it provides an improved vehicle body closure latch which will move a body closure between partially open and fully closed positions. A further feature of this invention is to provide such a closure latch which is power operated and includes means for releasing the closure from the latch independently of operation of the power operating means. Yet another feature of this invention is to provide an improved closure latch for moving a vehicle body closure between a partially open position and a fully closed position and including a movable support and a latch bolt mounted on the support for movement therewith between latched, unlatched and safety positions and movement relative thereto while in safety position. Yet a further feature of this invention is that the bolt is movable relative to the support when the bolt is in safety position to permit the bolt to engage a striker mounted on the closure and thereafter move the closure to closed position as the bolt moves with the support to latched position.

These and other features of this invention will be readily apparent from the following specification and drawings wherein:

FIGURE 1 is a partially broken away rear elevational view of a vehicle body embodying a closure latch according to this invention, with the latch being shown in latched position;

FIGURE 2 is an enlarged view of a portion of FIGURE 1 showing the latch in latched position in full lines and in unlatched position in dot-dash lines;

Figure 3:
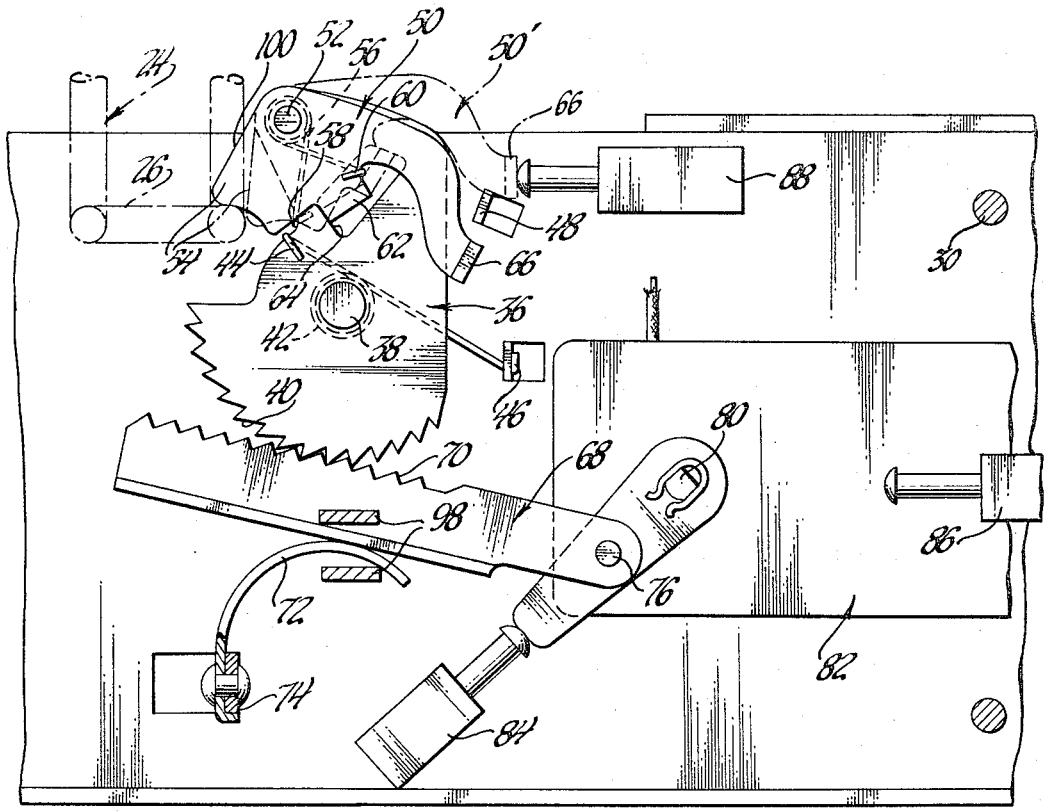
FIGURE 3 is a view showing the latch in safety position.

Referring now particularly to FIGURE 1 of the drawings, a vehicle body designated generally 10 includes a rear deck lid or closure member 12 hinged adjacent its forward edge 14 to the body for movement between closed position, as shown, and an open position, not shown, wherein the deck lid provides access to the rear compartment 16 of the body. The deck lid 12 includes an outer panel 18 which is hem flanged or otherwise secured to an inner panel 20. As indicated in FIGURE 2, a generally U-shaped bracket 22 is secured to the inner panel 20 of the deck lid and threadedly mounts the legs of a striker or striker means designated generally 24 and including a laterally bent U-shaped portion 26.

As shown in FIGURES 2 and 3, a generally channel shaped bracket 28 is bolted or otherwise secured at 30 to a rear body panel or member 32. A sector or support 36 is pivoted at 38 to bracket 28 and includes a ratchet tooth portion 40 along a portion of the edge thereof. A coil torsion spring 42 surrounds the pivot 38 and has one end 44 thereof hooked over an edge of the sector and the other end 46 thereof secured to an apertured tab of the bracket 28 to thereby continuously bias the sector 36 clockwise. The clockwise position of the sector is fixed by lanced tab 48 of the bracket 28. A bolt 50 is pivoted at 52 to the sector 36 for movement therewith and movement independently thereof. The bolt includes a notched striker engaging portion or foot 54 which is adapted to engage one of the legs of the striker portion 26 as will be described. A coil torsion spring 56 surrounds the pivot 52 and has one end 58 thereof hooked over an edge of the sector 36 and the other end 60 thereof hooked over a foot 62 of the bolt to continuously bias the bolt clockwise as viewed in FIGURE 2, with the bolt being located against the action of the spring 56 by a bent tab or foot 62 engaging one edge of an aperture 64 of the sector. Counterclockwise swinging movement of the bolt 50 is limited by tab 62 engaging an opposite edge of aperture 64. Another foot of the bolt includes a bent tab 66 for a purpose to be described.

A generally L-shaped ratchet member 68 has the tooth portion 70 thereof engaging the tooth portion 40 of the sector 36 and is biased into engagement with the sector by a leaf spring 72 secured to a tab 74 of the bracket 28. The ratchet 68 is pivoted at 76 to a crank arm 78 which is fixed to the output shaft 80 of an electric motor 82 suitably mounted on the bracket 28. Normally closed limit switches 84 and 86 are suitably mounted on the bracket 28 so as to be engageable by the crank arm 78 and a normally open momentary contact switch 88 is also mounted on the bracket 28 for engagement by the tab 66 of the bolt 50, as will be hereinafter described.

Figure 4:
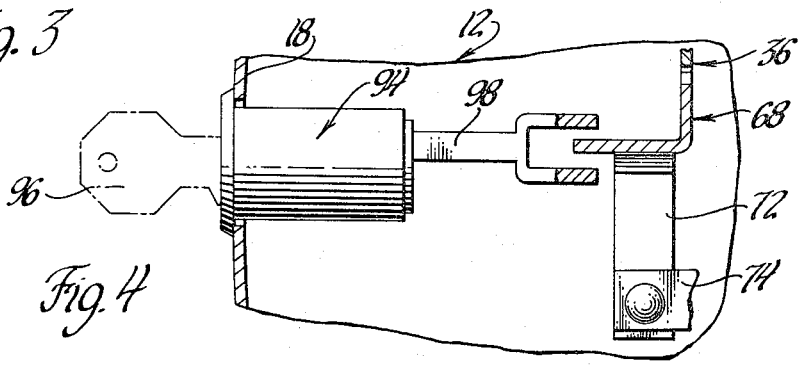
FIGURE 4 is an enlarged view taken generally along the plane indicated by line 4—4 of FIGURE 2.
Figure 5:
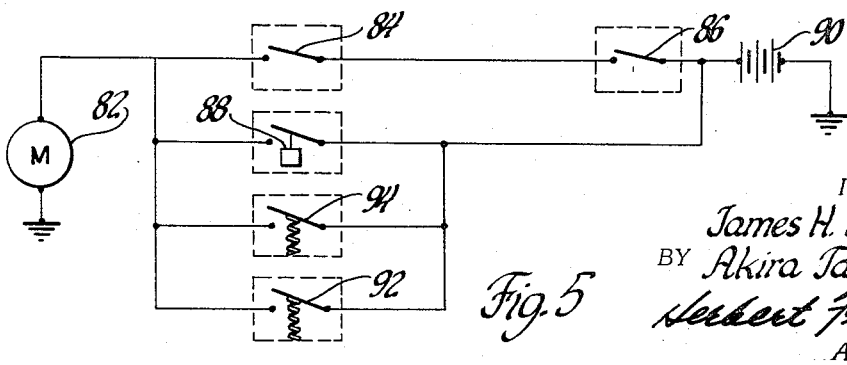
FIGURE 5 is a circuit diagram.

As shown in FIGURE 5, the switches 84 and 86 are connected in series with a source of power 90 and the motor 82. The switch 88 is also connected in series with the source of power and the motor 82 and in parallel with the switches 86 and 88. A glove box or instrument panel mounted normally open switch 92, FIGURE 1, is connected in series with the motor 82 and the source of power and in parallel with the switches 84 and 86 and with the switch 88. As shown in FIGURE 4, a conventional combined lock cylinder and switch 94 is mounted on the outer panel 18 of the deck lid 12. Upon insertion of a suitable key 96 into the lock cylinder and switch, partial rotation of the barrel closes the normally open switch 92 and further rotation of the barrel rotates a forked member 98. The forked member 98 straddles the ratchet member 68 as shown in FIGURE 4 and counterclockwise rotation of the forked member as viewed in FIGURES 2 and 3 moves the ratchet member out of engagement with the sector 36 for a purpose to be hereinafter described.

Referring now particularly to FIGURE 3 of the drawings, the closure latch is shown in full lines in safety position, when the deck lid 12 is in an open position, and it will be noted that the switches 84 and 88 are open but that the switch 86 is closed so that the circuit across the source of power 90 and motor 82 is not completed. Assuming now that the deck lid is moved from open position to a partially closed position, one leg of the striker portion 26 will engage the edge portion 100 of the bolt foot 54 to cam the bolt counterclockwise about the pivot 52 to its dot-dash position 50' against the action of the spring 56 until the striker leg has moved past the foot 54 and into engagement with the notch thereof. Thus, the deck lid will be in a partially latched or safety position. Upon counterclockwise swinging movement of the bolt to its dot-dash position 50', tab 66 will close switch 88 and energize the motor 82. It will be remembered that the switch 88 is a delayed momentary contact limit switch and as soon as the motor 82 is energized, the crank 78 will move out of engagement with the switch 84 to allow this switch to close so that a circuit across the motor is thereby completed across switches 84 and 86 and the motor will remain energized after the tab 66 of the bolt moves out of engagement with switch 88 and the switch returns to its normally open position.

Motor 82 will swing crank 78 counterclockwise to in turn shift the ratchet member 68 to the right and thereby swing sector 36 counterclockwise about pivot 38 to move the deck lid to a fully closed position with respect to the body 10 by engagement of the bolt 50 with the striker leg. When the deck lid reaches its closed position, the end of the crank arm 78 engages the switch 86 to open this switch and thereby deenergize the motor 82 so that the closure latch is then in its latched position, as shown in full lines in FIGURE 2.

If it is desired to release the deck lid so that it can be moved to its open position, either the switch 92 or the key cylinder and switch 94 may be actuated to energize the motor 82. When the motor is energized, the crank arm 78 will swing in a counterclockwise direction to thereby shift the ratchet 68 to the left and rotate the sector 36 counterclockwise from its position of FIGURE 2 toward its position of FIGURE 3. As the sector 36 moves toward its position of FIGURE 3, it will move through an intermediate position indicated in dot-dash lines in FIGURE 2 wherein the bolt 50 is located out of the path of the striker leg so that the striker leg is released from the bolt and the deck lid can be moved to an open position. This occurs approximately when the pivots 76 and 80 are aligned. Thereafter, upon continued counterclockwise swinging movement of the sector 36, it will move to its full line position as shown in FIGURE 3 so that the latch is ready for the next cycle of operation.

Upon rotation of the barrel of the key cylinder and switch 94 to a position so as to rotate the forked member 98, the ratchet 68 is moved out of engagement with the sector 36 so that the spring 42 will thereupon move the sector clockwise to a position in engagement with tab 48 to release the striker leg from engagement with the bolt 50. The motor 82 must, of course, be energized either through the switch 92 or the switch 94 so that the crank arm 78 can be moved to its position of FIGURE 3 to set the mechanism for the next cycle of operation. As the crank arm moves from its full line position of FIGURE 2 to its dot-dash position of FIGURE 2, the ratchet 68 will ratchet past the sector 36. As the crank 78 and ratchet move from their dot-dash position of FIGURE 2 to their full line position of FIGURE 3, the sector 36 will be rotated counterclockwise so as to locate the various parts of the latch in their position as shown in FIGURE 3.

Thus, this invention provides an improved closure latch.

We claim:

1. A closure latch for latching a closure member to a body member comprising, in combination, a support movably mounted on one of said members, a striker mounted on the other of said members, a latch bolt mounted on said support for movement therewith between latched, unlatched and safety positions and movement independently thereof in said safety position, said striker member being engageable with said bolt in the safety position thereof and partially closed position of said closure member relative to said body member to move said bolt relative to said support, power operated means for moving said support, and control means including switch means engageable by said bolt for energizing said power operated means to move said support relative to said one member and move said bolt in engagement with said striker member to latched position to move said other member relative to said one member to closed position.

2. A closure latch for latching a closure member to a body member comprising, in combination, a support movably mounted on one of said members, a striker mounted on the other of said members, a latch bolt mounted on said support for movement therewith between latched, unlatched and safety positions and movement independently thereof in said safety position, means biasing said bolt to unlatched position, power operated means for moving said support to locate said bolt in said positions thereof against the action of said biasing means, said striker member being engageable with said bolt in the safety position thereof and partially closed position of said closure member relative to said body member, means responsive to engagement of said striker member with said bolt for energizing said power operated means to move said support relative to said one member and move said bolt in engagement with said striker member to latched position to thereby move said other member relative to said one member to closed position, and means for releasing said power operated means from said support to permit said biasing means to move said support relative to said one member and locate said bolt in unlatched position.

3. A closure latch for latching a closure to a vehicle body comprising, in combination, a striker mounted on said closure, a toothed sector rotatably mounted on said body, a latch bolt rotatably mounted on said sector for movement therewith between latched, unlatched and safety positions and movement independently of said sector in said safety position, resilient means interconnecting said sector and said body to bias said sector to a position wherein said latch means is located in unlatched position, a ratchet engageable with said sector to move said sector relative to said body, power operated means for moving said ratchet, and control means for said power operated means, said bolt being located in the path of said striker in the safety position thereof and being movable by said striker toward the unlatched position thereof upon engagement of said striker with said bolt, said control means including switch means engageable by said bolt upon said movement thereof to energize said power operated means to move said sector relative to said body and move said bolt in engagement with said striker from said safety position thereof to said latched position thereof to move said closure to closed position relative to said body.

4. A closure latch for latching a closure member to a body member comprising, in combination, a latch support mounted on one member for movement to a plurality of positions with respect thereto, a striker mounted on the other member, a latch bolt mounted on the support for movement therewith in engagement with the striker and movement relative thereto into and out of engagement with the striker, power operated means, means operatively connecting the power operated means to the latch support for moving the latch support relative to the one member, and control means for the power operated means including first switch means operative upon movement of the latch support by the power operated means to a first position relative to the one member for deenergizing the power operated means and second switch means operative upon movement of the latch bolt relative to the latch support when the latch support is in the first position for energizing the power operated means independently of the first switch means to move the latch support relative to the one member from the first position toward a second position with respect thereto.

5. The combination recited in claim 4 including third switch means connected in series with the first switch means for energizing the power operated means, energization of the power operated means by the second switch means to move the latch support from the first position energizing the first switch means and permitting the first and third switch means to energize the power operated means independently of the second switch means.

6. The combination recited in claim 5 wherein the third switch means is operative upon movement of the latch support to the second position to deenergize the power operated means.

7. The combination recited in claim 5 wherein the latch support includes a toothed sector rotatably mounted on the one member and the connecting means includes a ratchet member, means resiliently biasing the ratchet member into engagement with the sector, and means for deenergizing the first and third switch means upon selective and alternate movement of the ratchet member with the sector to the first and second positions of the sector or movement of the ratchet member to first and second positions corresponding to the first and second positions of the sector.

8. The combination recited in claim 7 including means locating the sector to the second position thereof upon movement of the ratchet member out of engagement therewith, second control means for energizing the power operated means independently of the first control means, and manually operable means for moving the ratchet out of engagement with the sector and energizing the second control means to energize the power operated means, the first and third switch means continuing energization of the power operated means upon release of the manually operable means to move the ratchet relative to the sector to the ratchet second position.

References Cited

UNITED STATES PATENTS

| | | | |
|---|---|---|---|
| 2,709,910 | 6/1955 | Vigmostad. | |
| 2,752,188 | 6/1956 | Bachi | 292—201 X |
| 2,833,578 | 5/1958 | Burke | 292—216 X |
| 2,898,138 | 8/1959 | Van Noord | 292—201 X |
| 3,152,826 | 10/1964 | Smith | 292—201 X |

FOREIGN PATENTS 1,022,118   1/1958   Germany.

MARVIN A. CHAMPION, *Primary Examiner.*

RICHARD E. MOORE, *Examiner.*